United States Patent
Simi (10) Patent No.: US 8,779,676 B2
(45) Date of Patent: *Jul. 15, 2014

(54) DRIVER CIRCUIT FOR DIMMABLE SOLID STATE LIGHT SOURCE

(75) Inventor: Victor M. Simi, Lexington, KY (US)

(73) Assignee: OSRAM SYLVANIA Inc., Danvers, MA (US)

( * ) Notice: Subject to any disclaimer, the term of this patent is extended or adjusted under 35 U.S.C. 154(b) by 455 days.

This patent is subject to a terminal disclaimer.

(21) Appl. No.: 13/222,465

(22) Filed: Aug. 31, 2011

(65) Prior Publication Data

US 2013/0049589 A1    Feb. 28, 2013

(51) Int. Cl.
*H05B 33/08*    (2006.01)

(52) U.S. Cl.
CPC ........ *H05B 33/0815* (2013.01); *H05B 33/0887* (2013.01); *Y02B 20/341* (2013.01)
USPC ........... 315/219; 315/224; 315/247; 315/276; 315/307

(58) Field of Classification Search
CPC ........ H05B 37/00; H05B 37/02; H05B 33/00; H05B 33/02; H05B 33/08; H05B 33/0803; H05B 33/0806; H05B 33/0821; H05B 33/0842; H05B 33/0887
USPC ......... 315/307, 308, 246, 247, 276, 277, 278, 315/282, 279, 219, 224
See application file for complete search history.

(56) References Cited

U.S. PATENT DOCUMENTS

| | | | |
|---|---|---|---|
| 7,425,803 B2 | 9/2008 | Shao et al. | |
| 7,561,452 B2 | 7/2009 | Mednik et al. | |
| 7,658,510 B2 | 2/2010 | Russell | |
| 7,755,915 B2 | 7/2010 | Yan et al. | |
| 7,830,677 B2 | 11/2010 | Chou | |
| 8,384,295 B2 * | 2/2013 | Simi | ............................... 315/219 |
| 2006/0132061 A1 | 6/2006 | McCormick et al. | |
| 2007/0267984 A1 | 11/2007 | Peng | |
| 2008/0018261 A1 | 1/2008 | Kastner | |
| 2008/0278092 A1 | 11/2008 | Lys et al. | |
| 2009/0295776 A1 | 12/2009 | Yu et al. | |
| 2010/0295470 A1 * | 11/2010 | Koutensky | ..................... 315/294 |

FOREIGN PATENT DOCUMENTS

| | | |
|---|---|---|
| DE | 10 2009 010260 A1 | 9/2010 |
| EP | 2 254 227 A1 | 11/2010 |
| WO | 2009/001279 A1 | 12/2008 |
| WO | 2010/035155 A2 | 4/2010 |

OTHER PUBLICATIONS

Joao Carlos Silva, International Search Report and Written Opinion of the International Searching Authority for PCT/US12/47437, Sep. 26, 2012, pp. 1-9, European Patent Office, Rijswijk, The Netherlands.

(Continued)

*Primary Examiner* — David H Vu (74) *Attorney, Agent, or Firm* — Shaun P. Montana (57) ABSTRACT

A driver circuit for a dimmable solid state light source, and devices such as lamps and fixtures incorporating the same, and methods of driving such sources, are provided. A supply voltage circuit provides a supply voltage to a power factor controller circuit, such that the supply voltage is maintained within the high end of a nominal supply voltage operating range of the power factor controller circuit. The driver may also include an open circuit protection circuit for disabling the power factor controller circuit when an open circuit occurs in the load, and/or protection against electromagnetic interference (EMI).

20 Claims, 6 Drawing Sheets

(56) References Cited

OTHER PUBLICATIONS

C. Adranga & G. Gattavari, Flyback Converters With the L6561 PFC Controller, AN1060 Application Note, Jan. 2003, pp. 1-11, STMicroelectronics.

Claudio Adragna, Design Equations of High-Power-Factor Flyback Conversion Based on the L6561, AN1059 Application Note, Sep. 2003, pp. 1-20, STMicroelectronics.

Luca Salati, Switching From the L6561 to the L6562, AN1757 Application Note, Apr. 2004, pp. 1-9, STMicroelectronics.

20 W Dimmable CFL Ballast Solution, AN2590 Application Note, Oct. 2007, pp. 1-17, STMicroelectronics.

Hang-Seok Choi, Half-bridge LLC Resonant Converter Design Using FSFR-series Fairchild Power Switch (FPS TM), Application Note AN-4151, Oct. 9, 2007, Fairchild Semiconductor Corporation.

Transition-Mode PFC Controller, L6562, Jun. 2004, pp. 1-16, STMicroelectronics.

\* cited by examiner

DRIVER CIRCUIT FOR DIMMABLE SOLID STATE LIGHT SOURCE

TECHNICAL FIELD

The present invention relates to lighting, and more specifically, to driver circuitry for solid state light source(s).

BACKGROUND

A typical solid state light source, such as but not limited to a light emitting diode (LED), operates in a fundamentally different way than an incandescent light source or a gas discharge light source. A solid state light source typically requires an electronic circuit, known as a driver, driver circuit, or driver circuitry, to provide the requisite power to operate the solid state light source. A driver circuit for a solid state light source typically converts an alternating current (AC) input, such as a 120V/60 Hz line input or input from a dimmer switch, to a stable direct current (DC) voltage, which is used to drive the solid state light source. A typical driver circuit incorporates a rectifier for receiving the AC input and a DC-DC converter circuit, which receives an unregulated DC output from the rectifier and provides a stable, regulated DC output to the solid state light source.

A variety of DC-DC converter configurations are well-known in the art. One particular type is a switching regulator, and includes but is not limited to buck converters, boost converters, buck-boost converters, and the like. These converters typically include a switch, e.g. a transistor, which is selectively operated to allow energy to be stored in an energy storage device, e.g. an inductor, and then transferred to one or more filter capacitors. The filter capacitor(s) provide a relatively smooth DC output voltage to the load and provide essentially continuous energy to the load between energy storage cycles.

SUMMARY

A typical switching regulator configuration found in a solid state light source driver suffers from a variety of issues. One issue is that there may be no protective isolation between the unregulated DC voltage and the regulated DC output voltage. In some configurations, the unregulated DC voltage may be 400 Volts or more. The unregulated DC voltage may be dangerous (i.e., destructive), if inadvertently applied to the load. To provide protective isolation, therefore, a transformer-based switching regulator, such as a known "flyback" converter, may be used. In a transformer-based switching regulator, the primary side of the transformer may be coupled to the unregulated DC voltage. The regulated DC output voltage is provided at the secondary side of the transformer, which is electrically isolated from the primary side of the transformer. The transformer may thus provide protective isolation of the DC output from the unregulated DC voltage.

Another issue with a typical switching regulator configuration is that it involves a pulsed current draw from the AC power source in a manner that results in a less than optimum power factor. The power factor of a system is defined as the ratio of the real power flowing to the load to the apparent power, and is a number between 0 and 1 (or expressed as a percentage, e.g. 0.5 pf=50% pf). Real power is the actual power drawn by the load. Apparent power is the product of the current and voltage applied to the load. For systems with purely resistive loads, the voltage and current waveforms are in phase, changing polarity at the same instant in each cycle. Such systems have a power factor of 1.0, which is referred to as "unity power factor." Where reactive loads are present, such as with loads including capacitors, inductors, or transformers, energy storage in the load results in a time difference between the current and voltage waveforms. This stored energy returns to the source and is not available to do work at the load. Systems with reactive loads often have less than unity power factor. A circuit with a low power factor will use higher currents to transfer a given quantity of real power than a circuit with a high power factor.

To provide improved power factor, some solid state light source driver circuit configurations are provided with a power factor controller circuit. The power factor controller circuit may be used, for example, as a controller for controlling operation of the transistor switch in a DC-DC converter configuration such as a flyback converter. In such a configuration, a power factor controller may monitor the rectified AC voltage, the current drawn by the load, and the output voltage to the load, and provide an output control signal to the transistor to switch current to the load having a waveform that substantially matches and is in phase with the rectified AC voltage.

Yet another issue with a typical switching regulator configuration is that it may introduce harmonic distortion in the form of ripples on the voltage signal returned to the AC power source. These ripples occur at harmonics of the AC line frequency. When these ripples are fed back into the power line, some of the ripples, especially those at third order harmonics of the AC line frequency, may build up voltage levels on the neutral line of power-company-owned three-phase transformers and may damage power-company-owned equipment. Reducing the total harmonic distortion (THD) is thus becoming increasingly important as solid state light sources are more widely used. Indeed, reducing THD and increasing power factor may be important in complying with the Energy Solutions LED Accelerator Program (LEDA), which sets product qualification requirements for certain solid state light source-based lamps.

Unfortunately, THD can be exacerbated in solid state light source that includes a dimming control circuit. The dimming control circuit may receive line voltage, e.g. from a 120 VAC/60 Hz source, and provide a modified output signal to the rectifier for the purpose of controlling the illumination level of the solid state light source. In some configurations, the dimming control circuit may be a circuit known as a "phase control" dimmer or a "phase-cut" dimmer. In a phase control dimmer, a fraction of the input voltage sine-wave is cut in each period of the waveform either at the leading or trailing edge of the waveform. During the cut-time interval or "dead time" when the voltage is cut, the output of the phase control dimmer may be substantially zero. The residual time interval where the voltage differs from zero is known as the "dimmer conduction time." Both the dimmer conduction time and the dead time are variable, but the time period of the input voltage waveform is constant, e.g. 1/60 second in the United States. As used herein, the "dimmer setting" refers to the ratio of the dimmer conduction time to the time period of the input waveform. The dimmer setting of a phase control dimmer is controllable by a user. In some configurations, the dimmer setting may be varied from about 0.78 to about 0.25. During the dead time at the lowest dimmer setting of the dimmer, the supply voltage to the power factor controller circuit may diminish to a level below its nominal operating range. This may impact performance of the power factor controller circuit, and can lead to an increase in THD as well as reduced power factor.

Embodiments of the present invention therefore provide a solid state light source driver circuit and methods that convert AC input, such as a 120V/60 Hz input, into a current source for an solid state light source. The driver circuit includes overvoltage protection with optically isolated feedback from the output stage to the power factor controller. The driver circuit may use a single integrated circuit power factor controller to produce a pulsating DC output current that is amplitude modulated by the power factor controller at, for example, 120 hertz. The resulting input power factor may be set very close to unity. The total harmonic distortion at the input may be very low, and any conducted EMI may be mitigated by the variable frequency switching technique as well as the EMI filter components. The supply voltage circuit may eliminate the need for large electrolytic capacitors, or Zener diodes, for dimming applications. The circuit may thus provide a very high power factor, high efficiency, and small size that will work with dimmer switches, including both forward phase and reverse phase dimmers, without flicker in the solid state light source.

In an embodiment, there is provided a driver circuit for a light emitting diode (LED)-based light source. The driver circuit includes: a rectifier circuit configured to receive an AC input voltage and provide an unregulated DC voltage; a transformer having a primary winding coupled to the rectifier circuit, at least one secondary winding configured to be coupled to the LED-based light source, and a feedback winding; a switch, the switch being configured to close for coupling a portion of the unregulated DC voltage across the primary winding and the switch being configured to open to transfer energy from the primary winding to the secondary winding to provide a DC output voltage to drive the LED-based light source; a power factor controller circuit configured to provide an output signal to control the switch; and a supply voltage circuit coupled to the feedback winding and configured to provide a supply voltage to the power factor controller circuit at the high end of a nominal supply voltage operating range of the power factor controller circuit.

In a related embodiment, the supply voltage circuit may include: a first energy storage circuit coupled to the rectifier circuit to receive the unregulated DC voltage, wherein the first energy storage circuit may include a first energy storage element coupled to the power factor controller circuit to provide the supply voltage; and a second energy storage circuit coupled to the feedback winding, wherein the second energy storage circuit may include a second energy storage element; wherein current from the unregulated DC voltage may charge the first energy storage element and wherein current through the feedback winding may charge the second energy storage element and the first energy storage element.

In a further related embodiment, the first energy storage element may include a first capacitor and the second energy storage element may include a second capacitor. In a further related embodiment, the first capacitor and the second capacitor may be coupled in parallel.

In another related embodiment, the driver circuit may further include: an output; and an open circuit protection circuit coupled to the secondary winding and to the power factor controller circuit, the open circuit protection circuit configured to disable the power factor controller circuit when an open circuit occurs at the output. In a further related embodiment, the open circuit protection circuit may optically couple the secondary winding to the power factor controller circuit. In another further related embodiment, the open circuit protection circuit may include an optically isolated switch coupled to the power factor controller circuit and optically coupled to the secondary winding, the switch being configured to close when the open circuit occurs at the output.

In yet another related embodiment, the secondary winding may be capacitively coupled to the feedback winding, the capacitive coupling to provide electromagnetic interference (EMI) filtering.

In another embodiment, there is provided a lamp assembly. The lamp assembly includes: a lamp housing; an LED-based light source disposed within the lamp housing; and a driver disposed within the lamp housing. The driver includes: a rectifier circuit configured to receive an AC input voltage and provide an unregulated DC voltage; a transformer having a primary winding coupled to the rectifier circuit, at least one secondary winding configured to be coupled to the LED-based light source, and a feedback winding; a switch, the switch being configured to close for coupling a portion of the unregulated DC voltage across the primary winding and the switch being configured to open to transfer energy from the primary winding to the secondary winding to provide a DC output voltage to drive the LED-based light source; a power factor controller circuit configured to provide an output signal to control the switch; and a supply voltage circuit coupled to the feedback winding and configured to provide a supply voltage to the power factor controller circuit at the high end of a nominal supply voltage operating range of the power factor controller circuit.

In a related embodiment, the supply voltage circuit may include: a first energy storage circuit coupled to the rectifier circuit to receive the unregulated DC voltage, wherein the first energy storage circuit may include a first energy storage element coupled to the power factor controller circuit to provide the supply voltage; and a second energy storage circuit coupled to the feedback winding, wherein the second energy storage circuit may include a second energy storage element; wherein current from the unregulated DC voltage may charge the first energy storage element and wherein current through the feedback winding may charge the second energy storage element and the first energy storage element. In a further related embodiment, the first energy storage element may include a first capacitor and the second energy storage element may include a second capacitor. In a further related embodiment, the first capacitor and the second capacitor may be coupled in parallel.

In another related embodiment, the lamp assembly may further include: an output; and an open circuit protection circuit coupled to the secondary winding and to the power factor controller circuit, the open circuit protection circuit configured to disable the power factor controller circuit when an open circuit occurs at the output. In a further related embodiment, the open circuit protection circuit may optically couple the secondary winding to the power factor controller circuit. In another further related embodiment, the open circuit protection circuit may include an optically isolated switch coupled to the power factor controller circuit and optically coupled to the secondary winding, the switch being configured to close when the open circuit occurs at the output.

In yet another related embodiment, the secondary winding may be capacitively coupled to the feedback winding, the capacitive coupling to provide electromagnetic interference (EMI) filtering.

In another embodiment, there is provided a method of driving an LED-based light source. The method includes: receiving an AC input signal; converting the AC input signal into a regulated DC output; controlling a power factor of the regulated DC output using a power factor controller circuit; providing a supply voltage to the power factor controller circuit at the high end of a nominal supply voltage operating range of the power factor controller circuit; and coupling the regulated DC output to the LED-based light source.

In a related embodiment, converting may include: operating a switch to energize a transformer having a primary winding, at least one secondary winding, and a feedback winding, wherein the primary winding is coupled to the rectifier circuit and the at least one secondary winding is configured to be coupled to the LED-based light source; and controlling may include: controlling the switch; and the method may further include: coupling an open circuit protection circuit to the secondary winding and to the power factor controller circuit to disable the power factor controller circuit when the LED-based light source fails in an open state. In a further related embodiment, coupling an open circuit protection circuit may include optically coupling the secondary winding to the power factor controller circuit. In a further related embodiment, the method may further include capacitively coupling the secondary winding to the feedback winding.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments described herein provide circuits and methods for implementing a solid state light source driver. The driver may be used in combination with one or more solid state light sources in any type of configuration, such as but not limited to a lamp, lamp assembly, fixture, system, and the like. The solid state light source may be, but is not limited to, one or more light emitting diodes (LEDs), organic light emitting diodes (OLEDs), polymer light emitting diodes (PLEDs), and the like. Though embodiments may be, and in some cases are, described herein with reference to LEDs, any type of solid state light source and/or sources may be used without departing from the scope of the invention. The driver includes a power factor controller circuit and a supply voltage circuit configured to provide a supply voltage to the power factor controller circuit, such that the supply voltage is maintained within the high end of a nominal supply voltage operating range of the power factor controller circuit. Providing a supply voltage at the high end of a nominal supply voltage operating range of the power factor controller circuit allows for the use of small, non-electrolytic, capacitors in the supply voltage circuit, while still providing sufficient energy storage to allow for operation of the power factor controller circuit in conjunction with a dimmer circuit. This may result in a reduced cost and size of the driver, while still maintaining a low THD and high power factor.

Embodiments of a solid state light source driver as described herein may also, or alternatively, include an open circuit protection circuit for disabling the power factor controller circuit when an open circuit occurs in the load. The open circuit protection circuit provides protection against dangerous and potentially damaging voltages at the circuit output. Protection against electromagnetic interference (EMI) may also be provided in a driver according to embodiments described herein.

Figure 1:
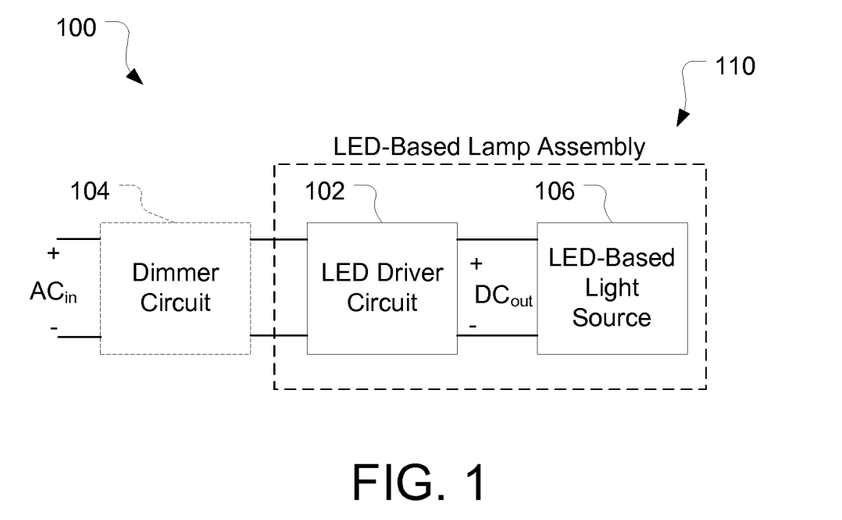
FIG. 1 shows a block diagram of a lamp assembly and dimmer circuit according to embodiments disclosed herein.

Turning now to FIG. 1, there is provided a simplified block diagram of a system 100 that includes a light emitting diode (LED) driver circuit 102 for receiving an alternating current (AC) input $AC_{in}$, either directly or through a known dimmer circuit 104, and providing a regulated direct current (DC) output $DC_{out}$ for driving an LED-based light source 106. The LED-based light source 106 may include a single LED, multiple LEDs interconnected in series and/or parallel configurations, and/or combinations of one or more LEDs and one or more other solid state light sources (e.g. OLED(s), PLED(s), etc.). In some embodiments, $AC_{in}$ may be provided directly from a 120 VAC/60 Hz line source. It is to be understood, however, that any known type of AC source, such as but not limited to a 220-240 VAC at 50-60 Hz, may be used without departing from the scope of the invention.

In embodiments including a dimmer circuit 104, the dimmer circuit 104 may take any known dimmer circuit configuration, such as but not limited to a standard forward or reverse "phase control" or "phase cut" dimmer provided in a wall switch, the operation of which is well-known. As described above, in a phase control dimmer circuit configuration, the dimmer circuit 104 cuts a fraction of the input voltage sinewave $AC_{in}$ in each period of the waveform to provide an AC input to the driver circuit having an associated dimmer setting.

The LED driver circuit 102 may convert the AC input voltage $AC_{in}$ to a regulated DC output voltage $DC_{out}$ with a high power factor, low THD, high efficiency, small size, and protective isolation. The LED driver circuit 102 and the LED-based light source 106 may thus be provided within an LED-based lamp assembly 110 according to embodiments described herein. The LED-based lamp assembly 110 may provide a convenient retro-fit for existing lighting fixtures configured to energize lamps including non-LED based light sources, e.g. fluorescent or gas-discharge sources. An LED-based lamp assembly 110 according to embodiments described herein may be inserted directly into such a lighting fixture to operate on the AC input thereto, and may operate with a known dimmer circuit including forward phase control and reverse phase control dimmer circuits. A lamp including an LED-based light source 106 may provide long life and low power consumption compared to those including non-LED-based light sources.

Figure 2:
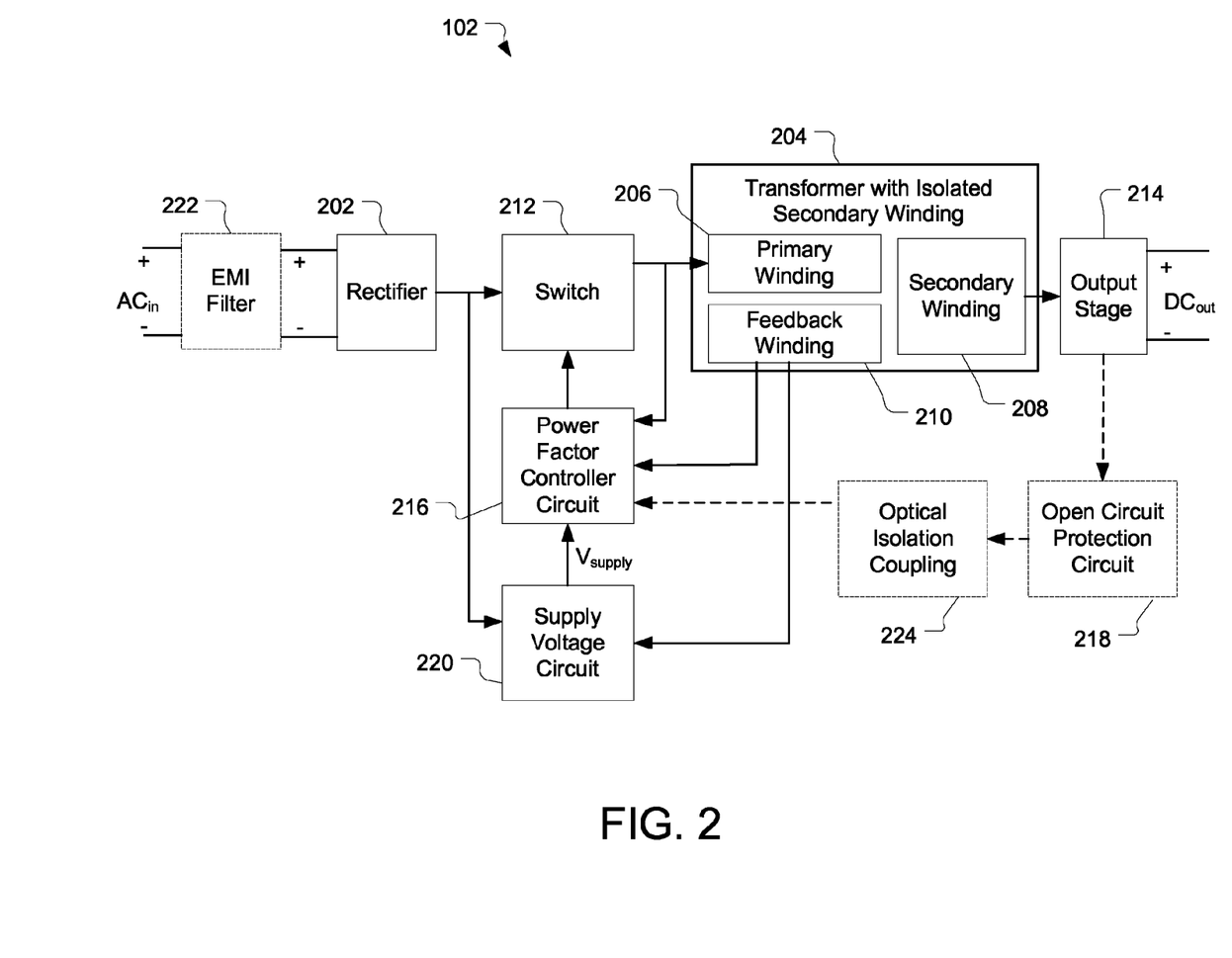
FIG. 2 is a block diagram of a solid state light source driver circuit according to embodiments disclosed herein.

FIG. 2 is a block diagram that conceptually illustrates the functionality of an LED driver circuit, such as the LED driver circuit 102 shown in block form in FIG. 1. As shown, an LED driver circuit 102 includes an optional electromagnetic interference (EMI) filter 222, a rectifier 202, a transformer 204 including a primary winding 206, a secondary winding 208, and a feedback winding 210, a switch 212 for coupling the output of the rectifier 202 to the primary winding 206 of the transformer 204, an output stage 214 coupled to a secondary winding 208 of the transformer, a power factor controller circuit 216, and a supply voltage circuit 220. The LED driver circuit 102 may also include an optional open circuit protection circuit 218 coupled to the power factor controller circuit 216 through an optically isolated coupling 224.

In general, the AC input voltage $AC_{in}$ may be coupled to the EMI filter circuit 222 or the rectifier circuit 202, either directly or, for example, through a dimmer circuit such as the dimmer circuit 104 shown in FIG. 1. The EMI filter circuit 222 may be configured to reduce EMI noise and to dampen ringing associated with forward phase control dimmers, such as but not limited to triac-based dimmers. In some embodiments, component values of the EMI filter circuit 222 may be chosen to adjust the phase angle between the input voltage and the input current to achieve lower THD.

The rectifier circuit 202 may be configured to rectify $AC_{in}$ to provide an unregulated DC output voltage, i.e. a DC output voltage that follows instantaneous variations in the AC input voltage. A variety of rectifier circuit configurations are well-known in the art. In some embodiments, for example, the rectifier circuit 202 may include a known bridge rectifier. The output of the rectifier circuit 202 may be coupled to the primary winding 206 of the transformer 204 through the switch 212 under the control of the power factor controller circuit 216. The switch 212 may be a known transistor switch, as is commonly used in known switching regulator configurations. In general, when the switch 212 is "closed," the primary winding 206 of the transformer 204 is coupled to the output of the rectifier circuit 202 and the energy is stored in the windings of the transformer 204. When the switch is "open," the energy stored in the secondary winding 208 is coupled to the output stage 214. The output stage 214 may include a capacitor that is charged by the energy from the secondary winding 208 and discharges through the LED-based light source 106 to drive the light source.

The power factor controller circuit 216 may include a known power factor controller configured to provide an output to the switch for controlling the switch in response to a first signal representative of current through the feedback winding 210 and a second signal representative of current through the primary winding 206. The power factor controller circuit 216 may also respond to a signal provided by the optional open circuit protection circuit that is representative of voltage across the secondary winding 208. The output from the power factor controller may control the switch so that the current to the LED-based light source 106 has a waveform that substantially matches and is in phase with the output of the rectifier circuit 202, thereby providing high power factor.

Known power factor controllers useful in an LED driver configuration, such as any embodiment described herein, include known integrated circuit power factor correction controllers, such as model number L6561 and L6562 controllers presently available from ST Microelectronics of Sunnyvale, Calif. The L6561 and L6562 controllers may, for example, be employed as a controller in a flyback DC-DC converter implementation. Details of this and related alternative applications of the L6561 controller are discussed in ST Microelectronics Application Note AN1060, "Flyback Converters with the L6561 PFC Controller," by C. Adragna and G. Garravarik, January 2003, and ST Microelectronics Application Note AN1059, "Design Equations of High-Power-Factor Flyback Converters based on the L6561," by Claudio Adragna, September 2003, each of which is available at http://www.st.com and is incorporated herein by reference. Differences between the L6561 and L6562 controllers are discussed in ST Microelectronics Application Note AN1757, "Switching from the L6561 to the L6562," by Luca Salati, April 2004, also available at http://www.st.com and incorporated herein by reference. For purposes of the present disclosure, these two controllers may be discussed as having similar functionality.

In the embodiment shown in FIG. 2 and some other embodiments, the secondary winding 208 of the transformer 204 is not electrically coupled to the primary winding 206 of the transformer 204, e.g. there is no common ground electrical path for the windings. In some embodiments, however, the secondary winding 208 may be capacitively coupled to the feedback winding 210 to improve EMI filtering, but no common ground electrical path for the windings results from this coupling. In some embodiments an optically isolated feedback is provided from the open circuit protection circuit 218 to the power factor controller circuit 216 through the optical isolation coupling 224. The optional open circuit protection circuit 218 may be configured to provide an output for shutting down or prohibiting operation of the power factor controller circuit 216 upon the occurrence of an open circuit in the load (e.g., the LED-based light source 106 shown in FIG. 1). For example, if the LED-based light source 106 ceases conducting current from the secondary winding 208, e.g. if the load is not connected or malfunctions, a dangerous overvoltage condition on the terminals of the transformer 204 may arise. In the illustrated embodiment, the open circuit protection circuit 218 is coupled between the output stage 214 and the power factor controller circuit 216. In embodiments including an L6561 or L6562 power factor controller, for example, the open circuit protection circuit 218 may be coupled to the zero current detection (ZCD) input of the power factor controller for shutting the controller down if an open circuit exists at the load. The optical isolation coupling 224 provides protective electrical isolation between the primary winding 206 side of the transformer 204, with potentially high voltages, and the secondary winding 208 side. In some embodiments, the open circuit protection circuit 218 may provide protection that complies with Underwriters Laboratory (UL) class 2 requirements.

In some embodiments, the supply voltage circuit 220 may establish a DC supply voltage $V_{supply}$ to the power factor controller circuit 216. In the illustrated embodiment, the supply voltage circuit 220 is coupled between the unregulated DC voltage, the feedback winding 210, and the power factor controller circuit 216. The supply voltage circuit 220 may be coupled to the power supply input (e.g. the Vcc in the L6561 or L6561) of the power factor controller circuit 216 and may provide the DC supply voltage $V_{supply}$ to the power factor controller circuit 216 at the high end of a nominal supply voltage operating range of the power factor controller circuit 216.

In particular, a power factor controller circuit 216 has power supply input operational range between a nominal low operating voltage $V_{low}$ and a nominal high operating voltage $V_{high}$. The nominal low operating voltage $V_{low}$ is the voltage below which the power factor controller circuit 216 stops providing pulsed output to the switch 212 and the nominal high operating voltage $V_{high}$ is a voltage above which damage to the power factor controller circuit 216 may occur. As used herein, use of the term "nominal" or "nominally" when referring to an amount means a designated or theoretical amount that may vary from the actual amount.

The values of the nominal low operating voltage $V_{low}$ and the nominal high $V_{high}$ operating voltage may be determined empirically, or, in the case of an integrated circuit power factor controller circuit 216, through use of manufacturer specifications. For an integrated circuit power factor controller, such as the L6561 or L6562 power factor controller, for example, the manufacturer sets the nominal high operating voltage $V_{high}$. The nominal low operating voltage $V_{low}$ for an integrated circuit power factor controller circuit 216 is also typically specified by the manufacture as the nominal voltage at which the power factor controller circuit 216 will turn off or stop providing an output after it has been operational. In the specific example of a L6562 power factor controller circuit 216, in the manufacturer data sheet the manufacturer identifies the nominal high operating voltage $V_{high}$ as 22 VDC and the nominal low operating voltage $V_{low}$ (at which the controller turns off) as 9.5 VDC.

The voltage reference circuit 220 may be configured to provide a voltage supply input $V_{supply}$ to the power supply input of the power factor controller circuit 216, such that $V_{supply}$ is between the nominal high operating voltage $V_{high}$ and the average of the nominal high operating voltage $V_{high}$ and the nominal low $V_{low}$ operating voltage:

$$V_{high} > V_{supply} \geq (V_{low} + V_{high})/2.$$

This places the value of $V_{supply}$ at the high end of the nominal supply voltage operating range of the power factor controller circuit 216. In the specific example of the L6562 power factor controller circuit having a $V_{high}$ of 22 VDC and a $V_{low}$ of 9.5 VDC, $V_{supply}$ would be less than 22 VDC but greater than or equal to 15.75 VDC. When a dimmer, such as the dimmer circuit 104 shown in FIG. 1 is used in conjunction with the LED driver circuit 102, the supply voltage circuit 220 may be configured to maintain the value of $V_{supply}$ at the high end of the nominal supply voltage operating range of the power factor controller circuit 216 even during the dead time associated with the lowest dimmer setting of the dimmer circuit 104. This allows for high power factor and low THD for all dimmer settings.

The supply voltage circuit 220 and the open circuit protection circuit 218 are described herein as being useful in connection with a solid state light source driver circuit wherein the secondary winding 208 is electrically isolated from the primary winding 206 but may be capacitively coupled to the feedback winding 210 and feedback may be optically coupled from the secondary winding 208 to the power factor controller circuit 216. Those of ordinary skill in the art will recognize, however, that these circuits 218, 220 may be provided in a wide variety of driver configurations. For example, these circuits may be included in a driver configuration including different transformer or feedback configurations.

Figure 3:
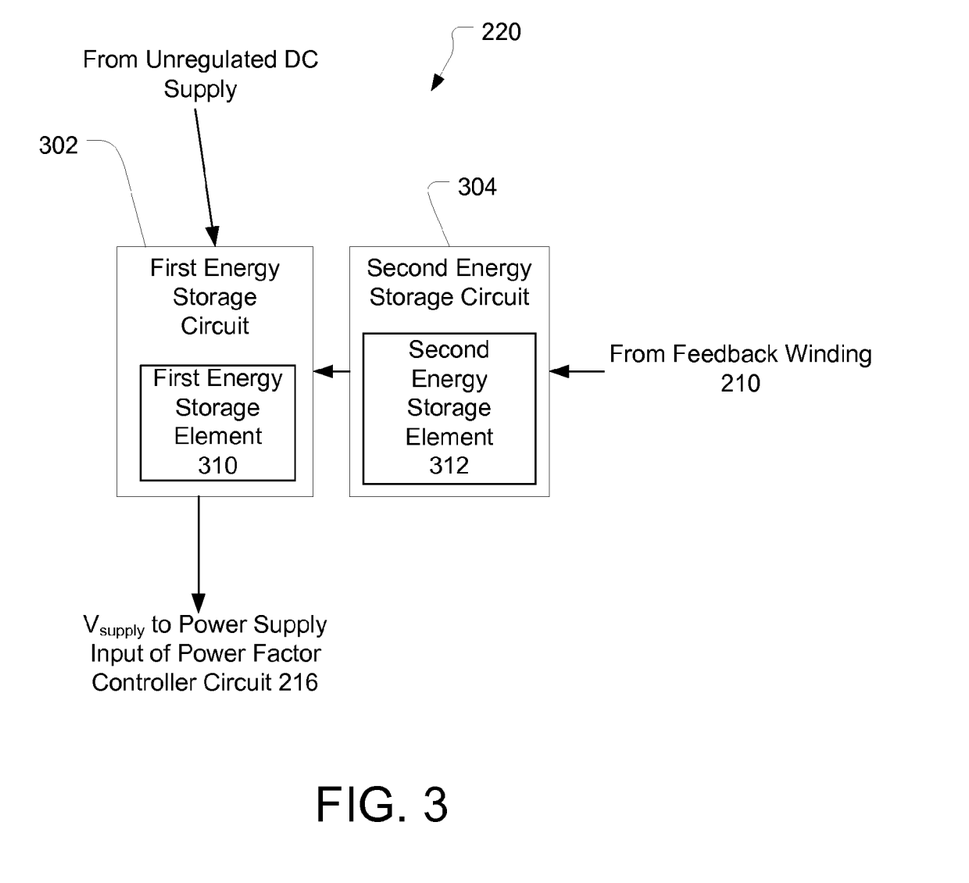
FIG. 3 is a block diagram of a supply voltage circuit according to embodiments disclosed herein.

FIG. 3 is a block diagram that conceptually illustrates the functionality of an embodiment of a supply voltage circuit 220. As shown, the supply voltage circuit 220 includes a first energy storage circuit 302 and a second energy storage circuit 304. The first energy storage circuit 302 is coupled to the unregulated DC voltage, which charges a first energy storage element 310 therein. The voltage across the first energy storage element 310 may be coupled the power factor controller circuit 216 as the $V_{supply}$ input. The second energy storage circuit 304 is coupled to the feedback winding 210 of the transformer 204. During the period when the switch 212 is open and energy is transferred from the primary winding 206 to the secondary winding 208 and the feedback winding 210, current from the feedback winding 210 charges a second energy storage element 312 in the second energy storage circuit 304 and also charges the first energy storage element 310. This combination of the first energy storage circuit 302 and the second energy storage circuit 304 allows the supply voltage circuit 220 to provide a consistent and stable DC supply input to the power factor controller circuit 216 that is at the high end of the nominal supply voltage operating range of the power factor controller circuit 216 even during the dead time associated with the lowest dimmer setting of a dimmer, such as but not limited to the dimmer circuit 104 shown in FIG. 1.

The supply voltage circuit 220 provides a supply voltage at the high end of the nominal supply voltage operating range of the power factor controller circuit 216. Thus, the supply voltage circuit 220 may include capacitors of reduced capacitance value while still maintaining sufficient energy storage capability. This is possible because the energy storage of a capacitor is proportional to $CV^2$, where C is the value of capacitance and V is the voltage across the capacitor. Such a configuration may be particularly useful when the system is implemented with a dimmer, such as but not limited to a phased controlled dimmer circuit, so that the supply voltage circuit 220 can maintain adequate voltage supply to the power factor controller circuit 216 during dimming, and thus avoid flicker in the LED-based light source 106. The ability to reduce capacitor size is also advantageous since larger capacitors (e.g., electrolytic capacitors) are expensive, prone to failure, and require increased time to charge, which may delay the turn-on time of the LED-based light source 106. The supply voltage circuit 220 may preferably be implemented without the use of Zener diodes to regulate the supply voltage of the power factor controller circuit 216 since the reduced capacitor sizes of embodiments may not have enough energy storage to avoid flicker in the LED-based light source 106 when the Zener diodes reach cut-off voltage.

Figure 4:
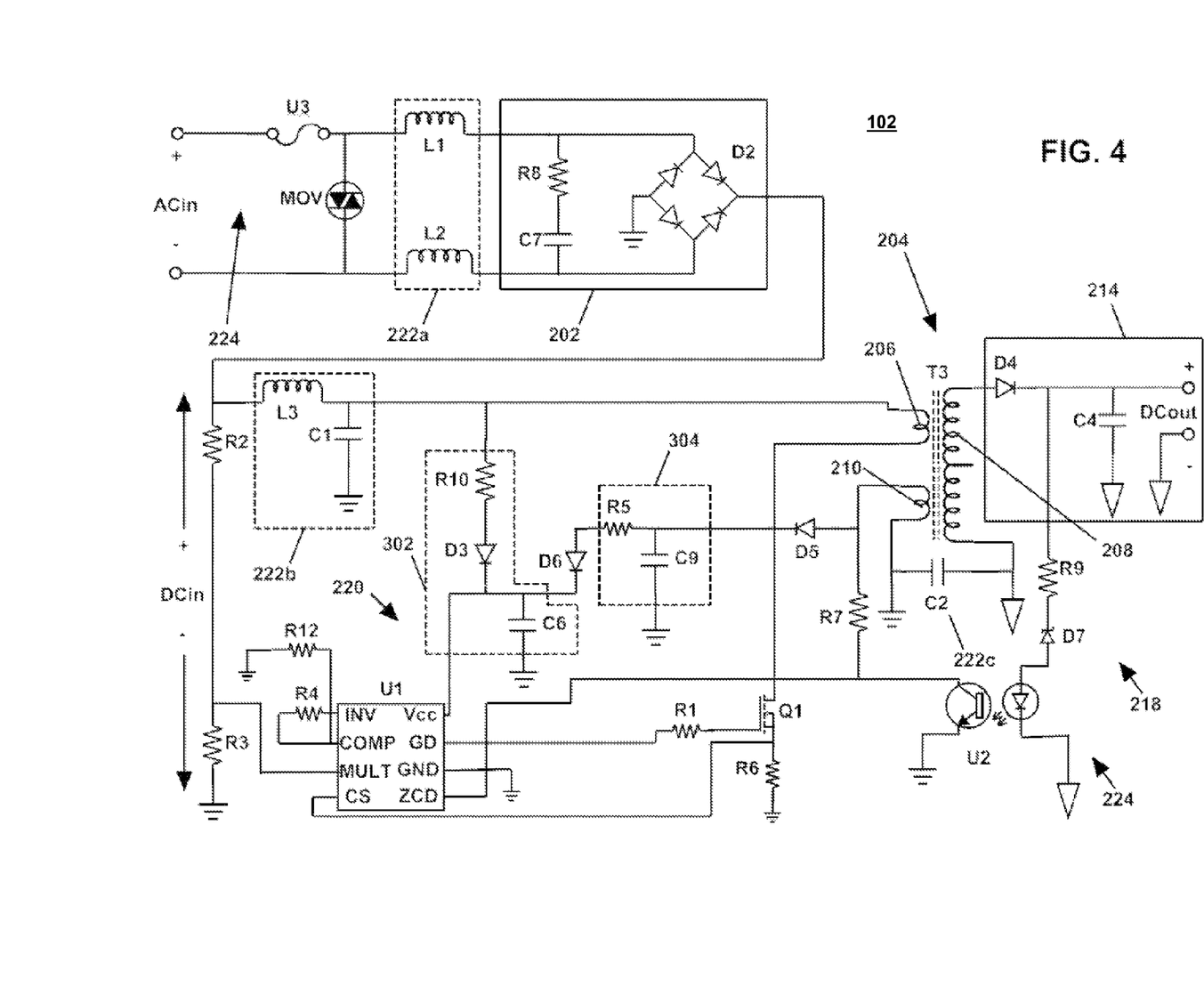
FIG. 4 is a circuit diagram of a solid state light source driver circuit according to embodiments disclosed herein.

FIG. 4 is a schematic diagram illustrating an embodiment of an LED driver circuit 102, which includes an input voltage surge protection circuit 224, an EMI filter 222a, a rectifier circuit 202, a transformer 204 including a primary winding 206, a secondary winding 208, and a feedback winding 210, a switch Q1 212 for coupling the output of the rectifier circuit 202 to the primary winding of the transformer 206, an output stage 214 coupled to the secondary winding 208 of the transformer 204, a power factor controller circuit 216, an open circuit protection circuit 218, an optical isolation coupling 224, and a supply voltage circuit 220 including a first energy storage circuit 302 and a second energy storage circuit 304. The power factor controller circuit 216 includes a L6562 integrated circuit power factor controller U1, the operation of which is known and described in ST Microelectronics Application Note AN1757, referred to above. Those of ordinary skill in the art will recognize, however, that other known power factor controllers may be used in place of the L6562 controller shown in the embodiment of FIG. 4.

In operation, the AC input to the circuit $AC_{in}$ is coupled to the rectifier circuit 202 through the surge protection circuit 224 and the EMI filter 222a. The surge protection circuit 224 includes a fuse U3 and a metal oxide varistor (MOV) which protect the LED driver circuit 102 from input voltage surges. The EMI filter 222a, including inductors L1 and L2, filters EMI noise generated in the circuit. The rectifier circuit 202 includes a known bridge rectifier. The rectifier circuit 202 rectifies the AC input to provide a rectified unregulated DC voltage $DC_{in}$. The output of the rectifier $DC_{in}$ is coupled to an inductor L3 and a capacitor C1 of an EMI filter 222b, which further filters EMI noise generated in the circuit. A third EMI filter 222c includes a capacitor C2, which couples the feedback winding ground to the secondary winding ground for additional EMI noise filtering. The values of the inductors L1, L2, and L3, and the capacitors C1, C2 and C7 may be chosen to adjust the phase angle between the input voltage and input current to achieve low THD.

The primary winding 206 of the transformer 204 is coupled between the output of the rectifier circuit 202 and the drain of the switch Q1 212 so that when the switch Q1 212 is conducting, i.e. the switch Q1 212 is closed, current flows from the output of the rectifier circuit 202 through the primary winding 206 to energize the primary winding 206, but when the switch Q1 212 is not conducting, i.e. the switch Q1 212 is open, essentially no current flows through the primary winding 206. In general, when the switch Q1 212 is closed, the windings of the transformer 204 are energized, and when the switch Q1 212 opens, the polarity of the voltage across the secondary winding 208 and the feedback winding 210 reverses to forward bias diodes D4 and D5. When the diode D4 is forward biased, energy from the secondary winding 208 charges a capacitor C4, which is configured to discharge through the load when the switch Q1 212 is open.

In general, the power factor controller U1 uses a voltage representative of the output of the rectifier circuit 202 $DC_{in}$ as a reference to control the level at which the power factor controller circuit 216 switches the switch Q1 212 on and off using the gate drive GD output coupled to the gate of the switch Q1 212 through a resistor R1. This feature allows a very high power factor driver. The switching frequency is determined by feedback from the primary 206 winding and the feedback winding 210. In particular, a portion of the $DC_{in}$ voltage is coupled to a multiplier input MULT of the power factor controller circuit 216 to provide a signal to the power factor controller U1 representative of the unregulated DC voltage $DC_{in}$. The MULT input is coupled between resistors R2 and R3. Selection of the value of the resistor R3 allows for a tradeoff between ripple and power factor correction in the output voltage $DC_{out}$ established by the power factor controller U1. The source of the switch Q1 212 is coupled to a current sense CS input of the power factor controller U1 and to a ground through a resistor R6. The current through the resistor R6 thus provides a signal to the power factor controller U1 representative of the current through the primary winding 206. The feedback winding 210 of the transformer 204 is coupled through a resistor R7 to a ZCD input of the power factor controller U1 to provide a signal to the power factor controller U1 representative of the current through the feedback winding 210. In response to the MULT, ZCD and CS inputs, the power factor controller U1 provides a variable frequency gate drive GD output to the switch Q1 212 for driving the load with a high power factor.

Supply voltage is supplied to the power factor controller U1 supply voltage input Vcc through the supply voltage circuit 220. When there is no starting pulse at the gate of the switch Q1 212, no current is provided from the rectifier circuit 202 output to energize the windings of the transformer 204. Once the voltage on Vcc reaches its minimum value, the gate drive output GD of the power factor controller U1 provides a starting pulse to the gate of the switch Q1 212 through the resistor R1 to close the switch Q1 212 so that at least a portion of the output of the rectifier circuit 202 is provided across the primary winding 206 to energize the windings of the transformer 204. The drain current in the switch Q1 212 begins to ramp up at a rate determined by the primary inductances of the transformer 204. This current produces a voltage across the resistor R6, which is representative of the current through the primary winding 206. This current is fed into the current sense CS input of the power factor controller U1. The power factor controller U1 compares this voltage to the voltage on the multiplier input MULT, which is set by the resistor R2 and R3, and the voltage on an inverting input INV, which is set by resistors R4 and R12, to limit the current through the switch Q1 212. When the voltage conditions are met according to the switching characteristics set by the power factor controller U1, the drive to the switch Q1 212 is removed. This causes the voltage across the primary winding 206 and the secondary winding 208 of the transformer 204 to reverse. The energy stored in the transformer 204 is then transferred to the output via the diode D4. The capacitor C4 reduces voltage swing on the output and provides noise reduction to the open circuit protection circuit 218. During this same time interval, the transformer 204 provides a voltage on the feedback winding 210 that forward biases the diode D5 to provide current to the supply voltage circuit 220.

In FIG. 4 as shown, the supply voltage circuit 220 includes a first energy storage circuit 302 and a second energy storage circuit 304. The first energy storage circuit 302 includes a resistor R10, a diode D3 and a first energy storage element, a capacitor C6. The second energy storage circuit 304 includes a second energy storage element, a capacitor C9, and a resistor R5, and is coupled to the feedback winding 210 through the diode D5. The first energy storage element C6 is coupled in parallel with the second energy storage element C9 through the diode D6. In operation, the unregulated DC voltage charges the capacitor C6 through the resistor R10 and the diode D3. The voltage across the capacitor C6 is coupled to the power supply input $V_{supply}$ to the power factor controller U1 power supply input $V_{cc}$. When the diode D5 is forward-biased by current through the feedback winding 210, a current is established through the resistor R5, which charges both of the capacitors C9 and C6. The capacitors C6 and C9 thus both provide supply voltage to the Vcc input of the power factor controller U1.

After all the energy is removed from the transformer 204, the voltage on the feedback winding 210 drops to zero. This negative transition on the zero current detection input ZCD of the power factor controller U1 instructs it to start a new cycle. After several cycles, the supply voltage output of the supply voltage circuit 220 reaches an operating level determined by the charge on the capacitors C6 and C9, which remains high enough to power the power factor controller U1 including time periods when the LED-based driver circuit 102 is operated by a dimmer, even during the dead time associated with the lowest dimmer setting.

The open circuit protection circuit 218 includes resistors R9 and R7, and a Zener diode D7. The open circuit protection circuit 218 is coupled to the power factor controller U1 by the optical isolation coupling 224, which in FIG. 4 is an optically isolated switch U2. The optically isolated switch U2 is optically coupled to the secondary winding 208 through the resistor R9 and the Zener diode D7, and is also coupled to the ZCD input of the power factor controller U1. When the LED-based driver circuit 102 is driving a load such as the LED-based light source 106 shown in FIG. 1, the optically isolated switch U2 is in a non-conducting (open) state. When an open circuit occurs at the load, e.g. due to failure of the LED-based light source 106 in an open state, the open circuit voltage of the output stage 214 is the breakdown voltage of the Zener diode D7 plus the forward voltage of the optically isolated switch U2. The optically isolated switch U2 enters a conducing state (closes) once the Zener diode D7 begins conducting. When the optically isolated switch U2 closes, the ZCD input of the power factor controller U1 is clamped to ground, which shuts down the power factor controller U1 and opens the switch Q1 212. The open circuit protection circuit 218 thus disables the current supply to the transformer 204 to provide protection against dangerous voltages occurring in the circuit due, for example, to disconnection or malfunction of the load.

A driver circuit according to embodiments described herein may be configured for operation with a variety of input voltages based on appropriate selection of various circuit components thereof. Table 1 below identifies one example of circuit components useful in configuring the embodiment illustrated in FIG. 4 for operation with a 120V RMs/60 Hz AC input signal (resistor values in ohms):

TABLE 1

| Component | Descriptor/Value |
|---|---|
| ACin | 120 VAC/60 Hz |
| C1 | 47 nf |
| C2 | 3.3 nF |
| C4 | 1 uF |
| C6 | 22 uf |
| C7 | 100 nF |
| C9 | 22 uF |
| D2 | DF10S |
| D3 | RS1M |
| D4 | RS3GB |
| D5 | RS1M |
| D6 | 1N4148 |
| D7 | BZV55 |
| DCout | LED connection |
| L1 | 1 mH |
| L2 | 4.7 mH |
| L3 | 2 mH |
| MOV | P1402 |
| Q1 | K4A60DA |
| R1 | 68 |
| R2 | 1.1M |
| R3 | 8.2k |
| R4 | 120k |
| R5 | 120 |
| R6 | 2 |
| R7 | 47k |
| R8 | 147 |
| R9 | 110 |
| R10 | 220k |
| R12 | 300k |
| T3 | LP = 66 uH |
| U1 | L6562 |
| U2 | TLP181 |
| U3 | C1Q5A |

Figure 5:
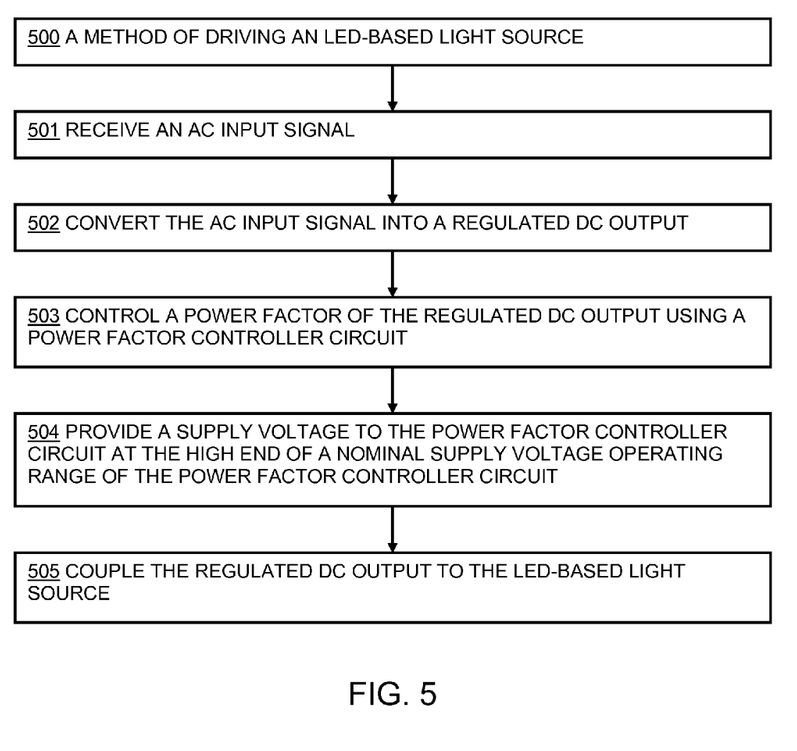
FIGS. 5 and 6 are block flow diagrams of methods according to embodiments disclosed herein.
Figure 6:
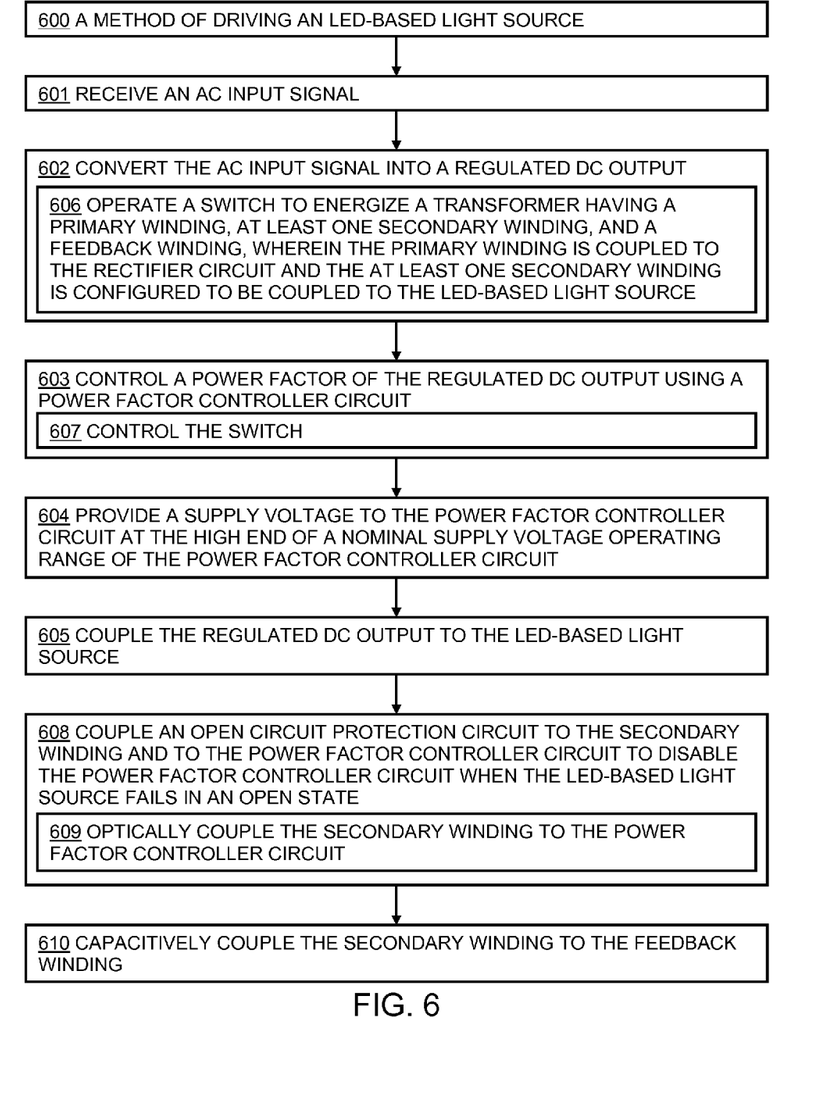

FIGS. 5 and 6 are block flow diagrams of methods 500 and 600 of driving an LED-based light source according to embodiments described herein. The illustrated block flow diagrams may be shown and described as including a particular sequence of steps. It is to be understood, however, that the sequence of steps merely provides an example of how the general functionality described herein can be implemented. The steps do not have to be executed in the order presented unless otherwise indicated.

In the methods 500 and 600 shown in FIGS. 5 and 6, an AC input signal is received, step 501/601. The AC input signal is converted into a regulated DC output, step 502/602. In some embodiments, a switch is operated, step 606, to energize a transformer having a primary winding, at least one secondary winding, and a feedback winding, wherein the primary winding is coupled to the rectifier circuit and the at least one secondary winding is configured to be coupled to the LED-based light source. A power factor of the regulated DC output is controlled, step 503/603, using a power factor controller circuit. In some embodiments, this is achieved by controlling the switch, step 607. A supply voltage is provided, step 504/604, to the power factor controller circuit at the high end of a nominal supply voltage operating range of the power factor controller circuit. The regulated DC output is coupled to the LED-based light source, step 505/605. In some embodiments, an open circuit protection circuit is coupled to the secondary winding and to the power factor controller circuit to disable the power factor controller circuit when the LED-based light source fails in an open state, step 608, which may additionally or alternatively include optically coupling the secondary winding to the power factor controller circuit, step 609. In some embodiments, the secondary winding may be capacitively coupled to the feedback winding, step 610.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A driver circuit for a light emitting diode (LED)-based light source, comprising:
    a rectifier circuit configured to receive an AC input voltage and provide an unregulated DC voltage;
    a transformer having a primary winding coupled to the rectifier circuit, at least one secondary winding configured to be coupled to the LED-based light source, and a feedback winding;
    a switch, the switch being configured to close for coupling a portion of the unregulated DC voltage across the primary winding and the switch being configured to open to transfer energy from the primary winding to the secondary winding to provide a DC output voltage to drive the LED-based light source;
    a power factor controller circuit configured to provide an output signal to control the switch; and
    a supply voltage circuit coupled to the feedback winding and configured to provide a supply voltage to the power factor controller circuit at the high end of a nominal supply voltage operating range of the power factor controller circuit.

2. The driver circuit of claim 1, wherein the supply voltage circuit comprises:
    a first energy storage circuit coupled to the rectifier circuit to receive the unregulated DC voltage, wherein the first energy storage circuit includes a first energy storage element coupled to the power factor controller circuit to provide the supply voltage; and
    a second energy storage circuit coupled to the feedback winding, wherein the second energy storage circuit includes a second energy storage element;
    wherein current from the unregulated DC voltage charges the first energy storage element and wherein current through the feedback winding charges the second energy storage element and the first energy storage element.

3. The driver circuit of claim 2, wherein the first energy storage element comprises a first capacitor and the second energy storage element comprises a second capacitor.

4. The driver circuit of claim 3, wherein the first capacitor and the second capacitor are coupled in parallel.

5. The driver circuit of claim 1, further comprising:
    an output; and
    an open circuit protection circuit coupled to the secondary winding and to the power factor controller circuit, the open circuit protection circuit configured to disable the power factor controller circuit when an open circuit occurs at the output.

6. The driver circuit of claim 5, wherein the open circuit protection circuit optically couples the secondary winding to the power factor controller circuit.

7. The driver circuit of claim 5, wherein the open circuit protection circuit comprises an optically isolated switch coupled to the power factor controller circuit and optically coupled to the secondary winding, the switch being configured to close when the open circuit occurs at the output.

8. The driver circuit of claim 1, wherein the secondary winding is capacitively coupled to the feedback winding, the capacitive coupling to provide electromagnetic interference (EMI) filtering.

9. A lamp assembly comprising:
    a lamp housing;
    an LED-based light source disposed within the lamp housing; and
    a driver disposed within the lamp housing, the driver comprising:
        a rectifier circuit configured to receive an AC input voltage and provide an unregulated DC voltage;
        a transformer having a primary winding coupled to the rectifier circuit, at least one secondary winding configured to be coupled to the LED-based light source, and a feedback winding;
        a switch, the switch being configured to close for coupling a portion of the unregulated DC voltage across the primary winding and the switch being configured to open to transfer energy from the primary winding to the secondary winding to provide a DC output voltage to drive the LED-based light source;
        a power factor controller circuit configured to provide an output signal to control the switch; and
        a supply voltage circuit coupled to the feedback winding and configured to provide a supply voltage to the power factor controller circuit at the high end of a nominal supply voltage operating range of the power factor controller circuit.

10. The lamp assembly of claim 9, wherein the supply voltage circuit comprises:
   a first energy storage circuit coupled to the rectifier circuit to receive the unregulated DC voltage, wherein the first energy storage circuit includes a first energy storage element coupled to the power factor controller circuit to provide the supply voltage; and
   a second energy storage circuit coupled to the feedback winding, wherein the second energy storage circuit includes a second energy storage element;
   wherein current from the unregulated DC voltage charges the first energy storage element and wherein current through the feedback winding charges the second energy storage element and the first energy storage element.

11. The lamp assembly of claim 10, wherein the first energy storage element comprises a first capacitor and the second energy storage element comprises a second capacitor.

12. The lamp assembly of claim 11, wherein the first capacitor and the second capacitor are coupled in parallel.

13. The lamp assembly of claim 9, further comprising:
   an output; and
   an open circuit protection circuit coupled to the secondary winding and to the power factor controller circuit, the open circuit protection circuit configured to disable the power factor controller circuit when an open circuit occurs at the output.

14. The lamp assembly of claim 13, wherein the open circuit protection circuit optically couples the secondary winding to the power factor controller circuit.

15. The lamp assembly of claim 13, wherein the open circuit protection circuit comprises an optically isolated switch coupled to the power factor controller circuit and optically coupled to the secondary winding, the switch being configured to close when the open circuit occurs at the output.

16. The lamp assembly of claim 9, wherein the secondary winding is capacitively coupled to the feedback winding, the capacitive coupling to provide electromagnetic interference (EMI) filtering.

17. A method of driving an LED-based light source, comprising:
   receiving an AC input signal;
   converting the AC input signal into a regulated DC output;
   controlling a power factor of the regulated DC output using a power factor controller circuit;
   providing a supply voltage to the power factor controller circuit at the high end of a nominal supply voltage operating range of the power factor controller circuit; and
   coupling the regulated DC output to the LED-based light source.

18. The method of claim 17, wherein converting comprises:
   operating a switch to energize a transformer having a primary winding, at least one secondary winding, and a feedback winding, wherein the primary winding is coupled to the rectifier circuit and the at least one secondary winding is configured to be coupled to the LED-based light source;
   and wherein controlling comprises:
   controlling the switch;
   and wherein the method further comprises:
   coupling an open circuit protection circuit to the secondary winding and to the power factor controller circuit to disable the power factor controller circuit when the LED-based light source fails in an open state.

19. The method of claim 18, wherein coupling an open circuit protection circuit comprises:
   optically coupling the secondary winding to the power factor controller circuit.

20. The method of claim 19, further comprising:
   capacitively coupling the secondary winding to the feedback winding.

* * * * *